United States Patent
Hongo et al.

(10) Patent No.: US 10,074,459 B2
(45) Date of Patent: Sep. 11, 2018

(54) CONDUCTIVE RESIN BODY, VEHICLE EARTH STRUCTURE, AND METHOD OF MANUFACTURING CONDUCTIVE RESIN BODY

(71) Applicant: Yazaki Corporation, Tokyo (JP)

(72) Inventors: Satoko Hongo, Susono (JP); Hiroki Kondo, Susono (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/711,093

(22) Filed: Sep. 21, 2017

(65) Prior Publication Data

US 2018/0090242 A1    Mar. 29, 2018

(30) Foreign Application Priority Data

Sep. 23, 2016    (JP) .................................. 2016-185176

(51) Int. Cl.

| | |
|---|---|
| H01B 5/00 | (2006.01) |
| H01B 5/16 | (2006.01) |
| B60R 16/03 | (2006.01) |
| H01B 1/24 | (2006.01) |
| H01B 13/00 | (2006.01) |
| B29C 70/86 | (2006.01) |
| B29C 70/88 | (2006.01) |

(52) U.S. Cl.
CPC ............... *H01B 5/16* (2013.01); *B29C 70/86* (2013.01); *B29C 70/882* (2013.01); *B60R 16/03* (2013.01); *H01B 1/24* (2013.01); *H01B 13/0036* (2013.01)

(58) Field of Classification Search
CPC ........ H01B 5/16; H01B 13/0036; H01B 1/24; B60R 16/03
USPC ....................................................... 174/126.1
See application file for complete search history.

(56) References Cited

U.S. PATENT DOCUMENTS

| | | | | |
|---|---|---|---|---|
| 3,711,934 A | * | 1/1973 | Zorowski | B29C 51/14 156/163 |
| 3,973,991 A | * | 8/1976 | Cestaro | H01M 4/14 428/408 |
| 4,507,346 A | * | 3/1985 | Maurer | B29C 44/0407 428/158 |
| 4,708,918 A | * | 11/1987 | Fitzgerald | C03C 3/087 429/210 |
| 5,500,272 A | * | 3/1996 | Padden | B32B 15/14 428/140 |
| 6,277,771 B1 | * | 8/2001 | Nishimura | B29C 70/22 442/229 |

(Continued)

FOREIGN PATENT DOCUMENTS

| | | |
|---|---|---|
| JP | 2008-24737 A | 2/2008 |
| JP | 2009-184611 A | 8/2009 |
| JP | 2013-173248 A | 9/2013 |

*Primary Examiner* — Sherman Ng
(74) *Attorney, Agent, or Firm* — Sughrue Mion, PLLC

(57) ABSTRACT

A conductive resin body includes a plurality of conductive fibers which are made of at least one type of carbon fibers, high-strength fibers, and glass fibers, and which are metal plated. A metal member is electrically connected to the plurality of conductive fibers. The conductive resin body also includes resin in which a part of the metal member is buried and with which the plurality of conductive fibers are impregnated. A rest of the metal member is exposed from the resin.

10 Claims, 11 Drawing Sheets

(56) References Cited

U.S. PATENT DOCUMENTS

| | | | | |
|---|---|---|---|---|
| 7,855,017 | B1* | 12/2010 | Snyder | H01M 10/0565 429/232 |
| 8,741,486 | B1* | 6/2014 | Jacobsen | H01M 2/1613 429/236 |
| 2010/0040902 | A1* | 2/2010 | Mizrahi | B23K 11/11 428/600 |
| 2012/0045606 | A1* | 2/2012 | Griess | B32B 3/06 428/57 |
| 2012/0049000 | A1* | 3/2012 | Kajita | B29C 70/088 244/119 |
| 2013/0202960 | A1* | 8/2013 | Kim | H01M 4/02 429/209 |
| 2013/0271891 | A1* | 10/2013 | Shimp | H02H 1/04 361/220 |
| 2013/0322962 | A1* | 12/2013 | Osada | F16B 3/00 403/361 |
| 2014/0130657 | A1* | 5/2014 | Pilpel | F41H 5/0485 89/36.02 |
| 2015/0158532 | A1* | 6/2015 | Ayuzawa | B62D 25/2009 296/193.07 |
| 2016/0053788 | A1* | 2/2016 | Iwano | B29C 65/70 403/268 |

* cited by examiner

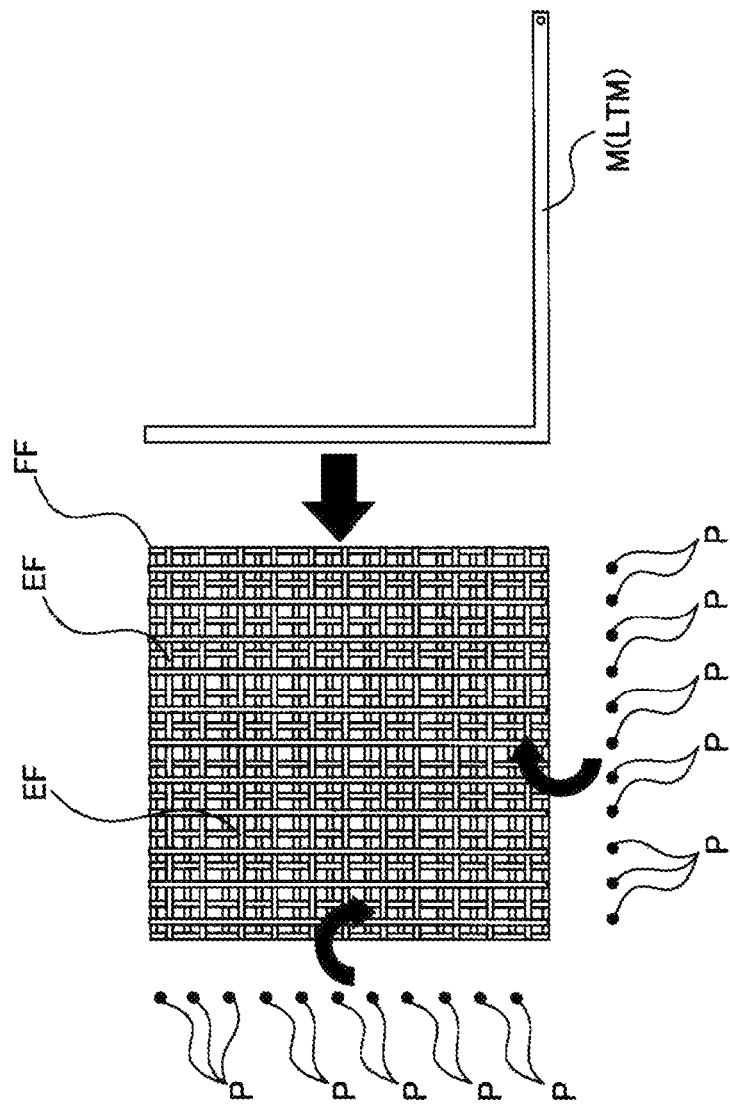

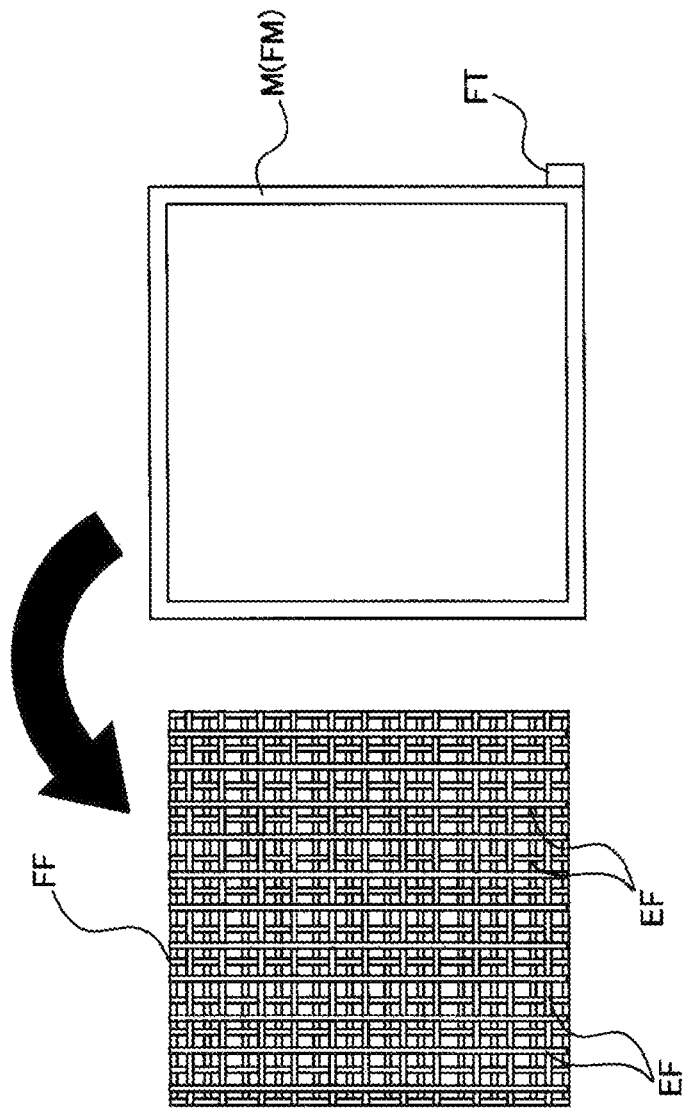

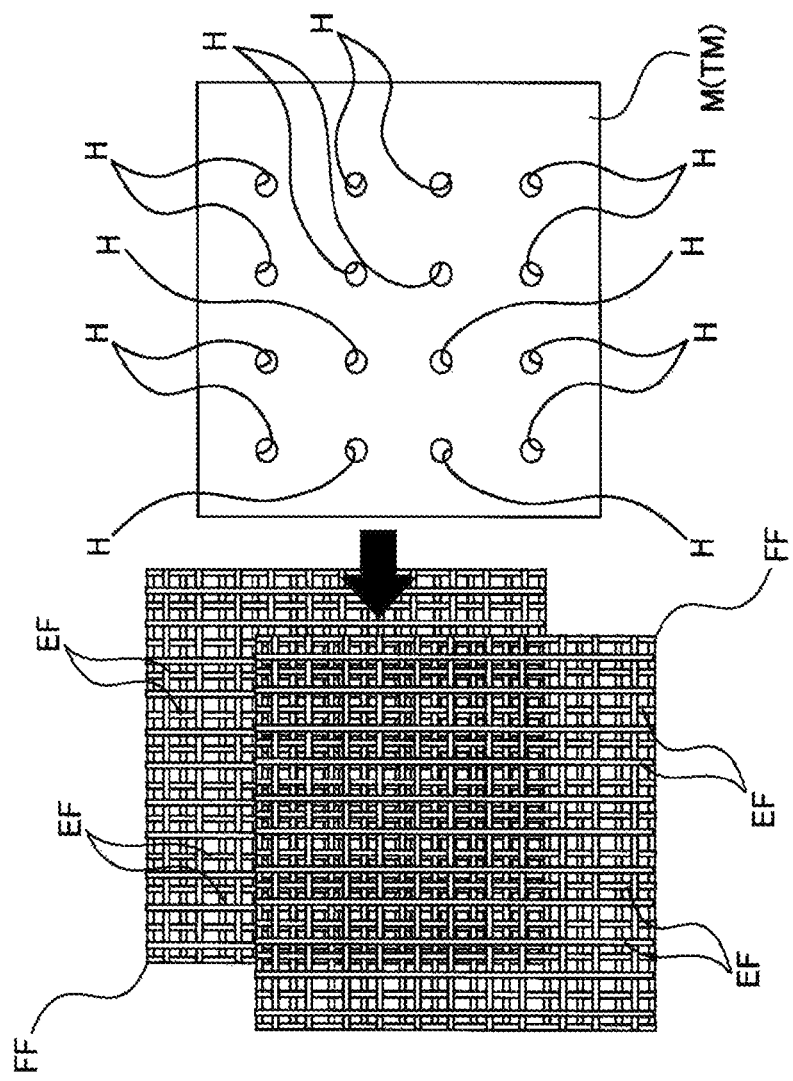

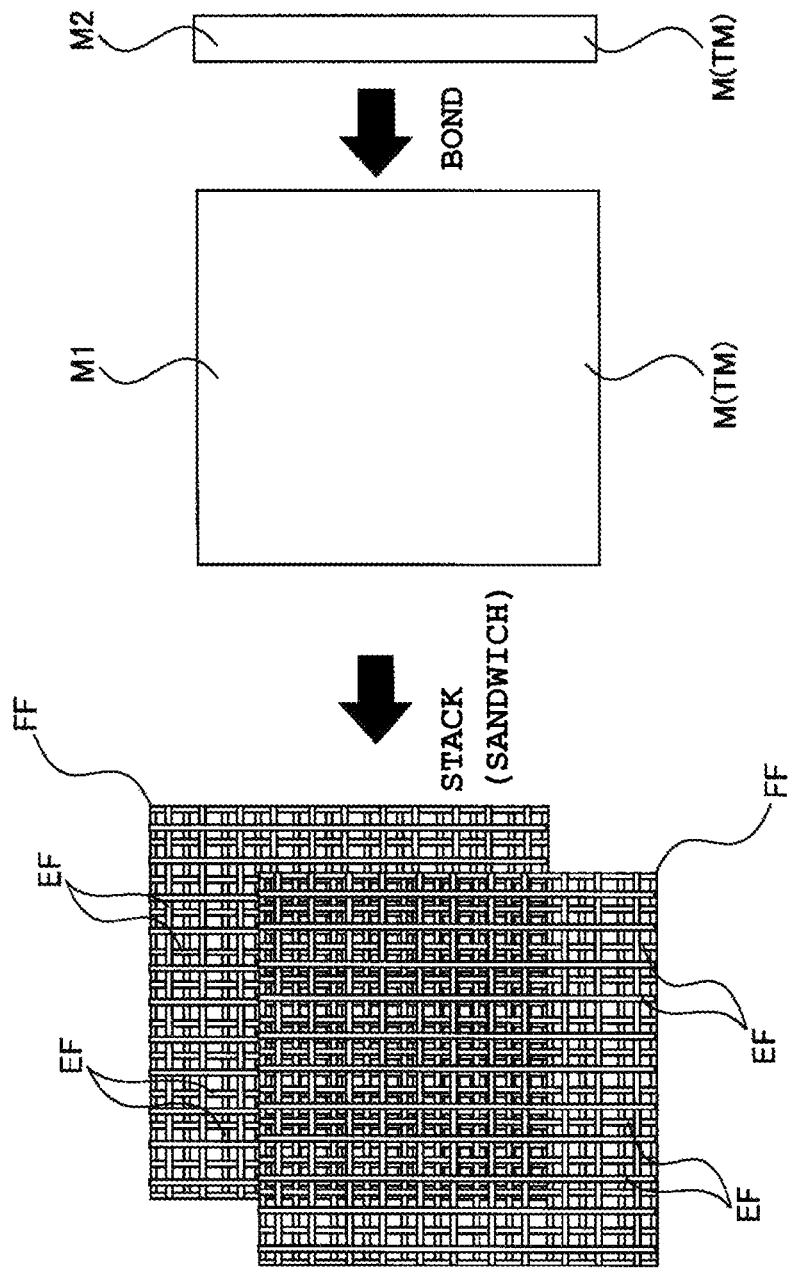

CONDUCTIVE RESIN BODY, VEHICLE EARTH STRUCTURE, AND METHOD OF MANUFACTURING CONDUCTIVE RESIN BODY

CROSS REFERENCE TO RELATED APPLICATIONS

This application claims priority from Japanese Patent Application No. 2016-185176 filed on Sep. 23, 2016, the entire contents of which are incorporated herein by reference.

BACKGROUND OF THE INVENTION

Field of the Invention

The present invention relates to a conductive resin body, a vehicle earth structure, and a method for manufacturing the conductive resin body.

Description of Related Art

In the related art, there has been a demand for reduction in weight of an automobile in order to improve fuel efficiency, and thus studies of using, in a vehicle body, fiber-reinforced plastic (FRP) obtained by impregnating resin between high-strength fibers have been conducted. However, in a case where the fiber-reinforced plastic is used in the vehicle body, the vehicle body has lower electroconductivity than that of a steel plate body. Therefore, various measures need to be taken because body earth is not performed, low shielding effectiveness is achieved, or a measure against lightning strike needs to be taken.

A technology of realizing an earth structure of a vehicle by using an earth plate is proposed (for example, see Patent Document 1: JP-A-2009-184611). However, in the technology, is necessary to add a component called the earth plate, and it is also necessary to add a step of attaching the earth plate to fiber-reinforced plastic.

A conductive resin body that has high conductivity because metal plating is performed on fibers in fiber-reinforced plastic is proposed (see Patent Document 2: JP-A-2008-024737). Since the conductive resin body has higher conductivity than that of the fiber-reinforced plastic in the related art, the conductive resin body can be used as an earth member like a metal frame, and it is possible not to use an earth plate. However, it is also necessary to perform an additional process such as forming a bolt hole such that the conductive resin body is electrically connected to a negative terminal of a vehicle battery or a device.

In addition, a bonding technology between fiber-reinforced plastic and metal is also proposed (see Patent Document 3: JP-A-2013-173248). In the technology, the fiber-reinforced plastic is brought into contact with the metal, the metal is irradiated with a laser beam, and the metal and the fiber-reinforced plastic are heated to be bonded. In addition, bonding may be performed with an adhesive.
[Patent Document 1] JP-A-2009-184611
[Patent Document 2] JP-A-2008-024737
[Patent Document 3] JP-A-2013-173248

According to a related art, a number of components and an additional process increases, and additional processes of forming bolt holes, bonding with metal, or the like are needed.

SUMMARY

One or more embodiments provide a conductive resin body, a vehicle earth structure using the conductive resin body, and a method for manufacturing the conductive resin body so that it is possible to prevent an increase in the number of components and not to use an attachment process of a metal member.

In accordance with one or more embodiments, a conductive resin body includes a plurality of conductive fibers which are made of at least one type of carbon fibers, high-strength fibers, and glass fibers, and which are metal plated, a metal member which is electrically connected to the plurality of conductive fibers, and resin in which a part of the metal member is buried and with which the plurality of conductive fibers are impregnated. A rest of the metal member is exposed from the resin.

In the conductive resin body, since a part of the metal member is buried and the rest thereof is exposed, the conductive resin body and the metal member are integrally formed such that the number of components is prevented from increasing, and it is not necessary to attach the metal member later. Hence, it is possible to provide the conductive resin body by which it is possible to prevent an increase in the number of components and not to use an attachment process of the metal member.

In accordance with one or more embodiments, the plurality of conductive fibers may have a structure of a stacked body in which two or more layers stacked. The metal member may be a planar thin metal member positioned between two adjacent layers of the two or more layers.

In the conductive resin body, the plurality of conductive fibers form the stacked body by stacking two or more layers thereof, and the metal member is a planar thin metal member positioned in one layer of the two or more layers. Therefore, the metal member is sandwiched, and thus, it is possible to bury the metal member in which there is reduction in a possibility that the metal member will drop from the conductive resin body.

In accordance with one or more embodiments, the metal member may include a plurality of openings.

In the conductive resin body, since the thin metal member is provided with the plurality of openings, portions of resin on both surfaces of the thin metal member are connected through the opening, and thus it is possible to improve a degree of adhesion of the thin metal member to the resin.

In accordance with one or more embodiments, the conductive resin body may further include a conductive metal pin. The plurality of conductive fibers may be arranged in a plane. The metal member may be a planar thin metal member that is stacked on the plurality of conductive fibers arranged in a plane. The metal pin may extend in a direction intersecting with the plane, and may electrically connect between the plurality of conductive fibers and the metal member.

In the conductive resin body, since the metal pin extends in a direction intersecting with the plane, and electrically connects conductive fiber and the thin metal member, the conductive fiber and the thin metal member may not be brought into direct contact with each other, and it is possible to achieve easy conduction between the conductive fiber and the thin metal member.

In accordance with one or more embodiments, the plurality of conductive fibers may be arranged in a plane. The metal member may include a frame member positioned in an outer peripheral side of the plane in which the plurality of conductive fibers arranged.

In the conductive resin body, the plurality of conductive fibers are arranged in the plane, and the metal member is the frame member provided on the outer peripheral side of the plane of the plurality of conductive fibers arranged in the plane. Therefore, electrical connection is performed in a state in which the metal member surrounds the plurality of conductive fibers, and thus it is possible to provide the conductive resin body in which it is relatively easy to impregnate the fiber with resin without inhibiting the conductive fiber from being impregnated with the resin by presence of the metal member.

In accordance with one or more embodiments, an earth structure of a vehicle may include the conductive resin body, which is used as a body for a vehicle. A portion of the metal member of the conductive resin body, which is exposed from the resin, may be electrically connected to a negative terminal of a in-vehicle device and a vehicle battery.

In the vehicle earth structure, since the portion of the metal member of the conductive resin body, which is exposed from resin, is electrically connected to the negative terminals of the in-vehicle device and the vehicle battery, it is possible to use fiber-reinforced resin in a portion called a body for a vehicle in which the strength is required, and it is possible to build an earth structure through electrical connection with the negative terminals of the in-vehicle device and the vehicle battery because predetermined conductivity is obtained with the fiber subjected to the metal plating. Further, it is possible to electrically connect the negative terminal to the exposed portion of the metal member, and it is possible to provide the earth structure in which it is not necessary to perform an attachment process of the metal member.

In accordance with one or more embodiments, a method for manufacturing a conductive resin body includes metal plating a plurality of fibers which are made of at least one type of carbon fiber, high-strength fiber, and glass fiber, assembling and electrically connecting a metal member to a plurality of conductive fibers which are metal plated, and molding a assemble with resin such that a part of the metal member is buried in the resin and a rest of the metal member is exposed from the assemble.

In the method for manufacturing the conductive resin body, the resin molding is performed such that a part of the metal member is buried and the rest thereof is exposed. Therefore, the conductive resin body and the metal member are integrally formed such that the number of components is prevented from increasing, and it is not necessary to attach the metal member later. Hence, it is possible to provide the conductive resin body by which it is possible to prevent an increase in the number of components and it is possible not to use the attachment process of a metal member.

In accordance with one or more embodiments, the method for manufacturing a conductive resin body, may further include molding the plurality of conductive fibers with the resin and forming an intermediate member which is metal plated before the assembling and electrically connecting. In the assembling and electrically connecting, the metal member may be electrically connected to the plurality of conductive fibers which the intermediate member includes.

In the method for manufacturing the conductive resin body, since the intermediate member is formed by impregnating the plurality of conductive fibers with the resin, the plurality of conductive fibers are prevented from moving when resin molding is performed in a mold in the resin molding step, and thus it is possible to reduce frequency of an occurrence of an electrical connection problem with the metal member.

According to one or more embodiments, it is possible to provide the conductive resin body, the vehicle earth structure using the conductive resin body, and the method for manufacturing the conductive resin body by which it is possible to prevent an increase in the number of components and it is possible not to use an attachment process of a metal member.

BRIEF DESCRIPTION OF THE DRAWINGS

FIG. 2A is a plan view, and FIG. 2B is a side view.

FIG. 5A is a plan view, and FIG. 5B is a side view.

FIG. 6 illustrates an exploded view of the conductive resin body in FIGS. 5A and 5B.

FIG. 7A is a plan view, and FIG. 7B is a sectional view taken along line B-B.

FIG. 8 illustrates an exploded view of the conductive resin body in FIGS. 7A and 7B.

FIG. 9 illustrates an exploded view of a conductive resin body according to a fourth embodiment.

FIG. 10A is a plan view, and FIG. 10B is a sectional view of FIG. 10A.

FIG. 11 illustrates an exploded view of the conductive resin body in FIGS. 10A and 10B.

DETAILED DESCRIPTION

Hereinafter, preferred embodiments will be described in order. The present invention is not limited to the embodiments described below, and it is possible to perform various modifications within a range without departing from the gist of the present invention.

Figure 1:
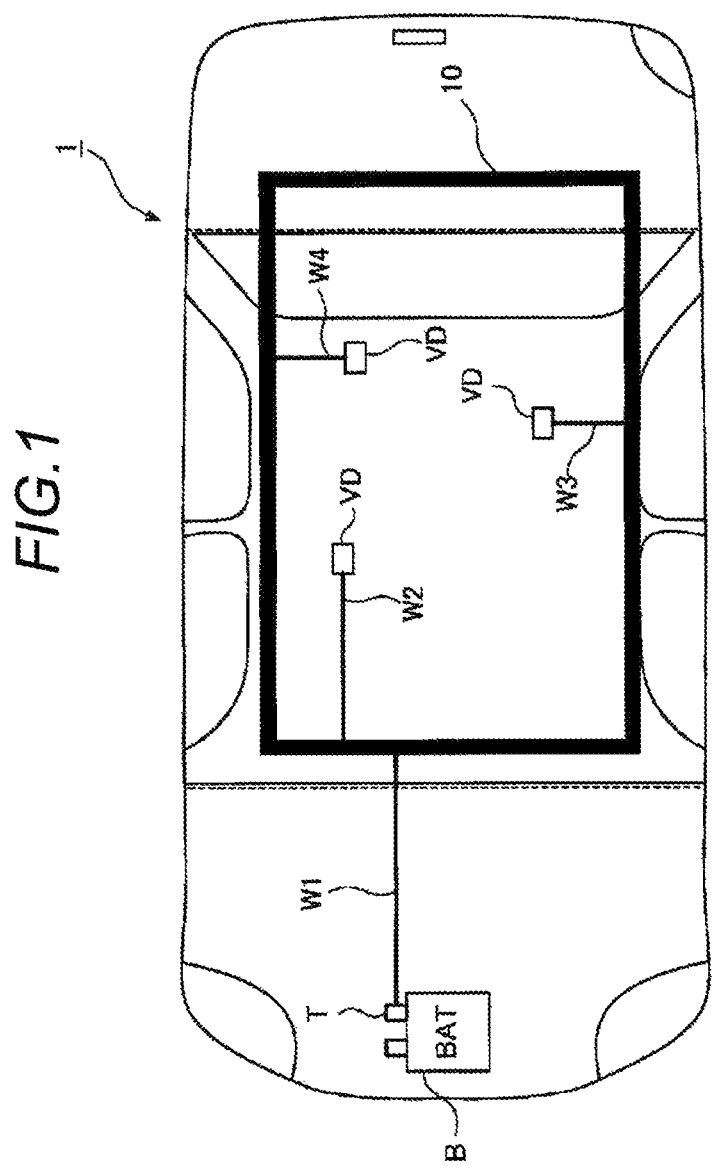
FIG. 1 is a top view of a vehicle illustrating a vehicle earth structure using a conductive resin body according to an embodiment of the present invention.

FIG. 1 is a top view of a vehicle illustrating a vehicle earth structure using a conductive resin body according to a first embodiment of the present invention. As illustrated in FIG. 1, a vehicle earth structure 1 is a structure for securing an earth line between a vehicle battery B and a plurality of in-vehicle devices VD installed in the vehicle, and is configured to include a conductive resin body 10 and various types of electric wires W1 to W4.

The conductive resin body 10 is made of fiber-reinforced resin (for example, a material referred to as carbon fiber reinforced plastic or fiber-reinforced plastic) obtained by impregnating, with resin, a plurality of strands of fiber made of at least one type of carbon fiber, high-strength fiber, and glass fiber. Here, the high-strength fiber described above is aramid fiber, polyarylate fiber, poly(p-phenylenebenzobisoxazole) (PBO) fiber, or the like, and has the tensile strength of 1 GPa or higher at break and the elongation percentage of 1% or higher and 10% or lower at break. In addition, for example, epoxy resin is used as the resin (resin as a base substance) with which the impregnation is performed.

The conductive resin body 10 in the embodiment is obtained by performing metal plating (for example, copper plating) on the fiber described above. The conductive resin body 10 has higher conductivity than that of common fiber-reinforced resin due to such metal plating. Further, the conductive resin body 10 according to the embodiment is used in a body (for example, a vehicle frame) for a vehicle.

A first electric wire W1 is an electric wire that electrically connects a negative terminal T of a vehicle battery B and the conductive resin body 10. The first electric wire W1 may be directly connected to the negative terminal T of the vehicle battery B, and may be electrically connected to the negative terminal T of the vehicle battery B via another member. In addition, the first electric wire W1 is electrically connected to a metal member (a part of a configuration of the conductive resin body 10 and represented by reference sign M which will be described below) having a part that is buried in the resin and the rest that is exposed, as will be described below, on the conductive resin body 10 side.

Second to fourth electric wires W2 to W4 are electric wires that electrically connect negative terminals of the in-vehicle devices VD and the conductive resin body 10. The second to fourth electric wires W2 to W4 may be directly connected to the negative terminals of the in-vehicle devices VD, and may be electrically connected to each other via another member such as a terminal. In addition, the second to fourth electric wires W2 to W4 are electrically connected to metal members (a part of the configuration of the conductive resin body 10 and represented by the reference sign M which will be described below) on the conductive resin body 10 side.

Figure 2A:
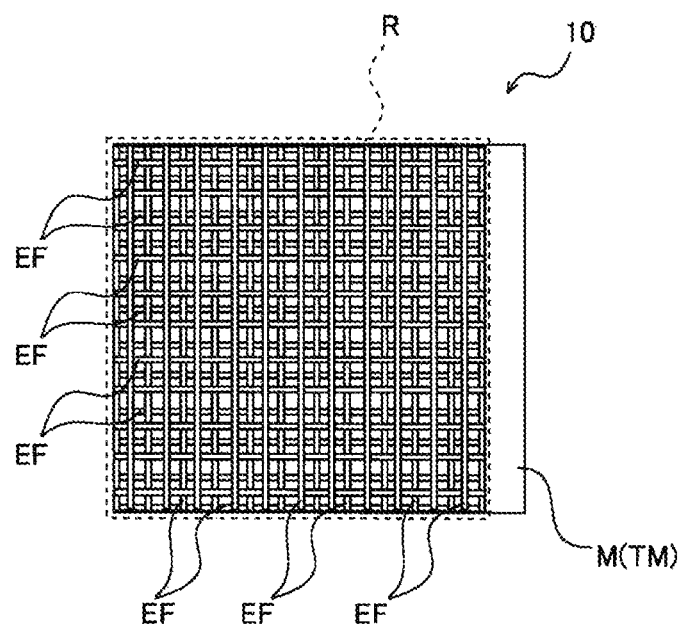
FIGS. 2A and 2B illustrate external views of the conductive resin body in FIG. 1.
Figure 2B:
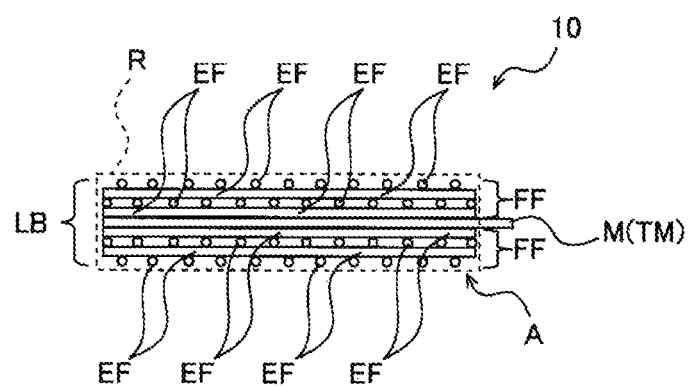

FIGS. 2A and 2B illustrate external views of the conductive resin body 10 in FIG. 1, FIG. 2A is a plan view, and FIG. 2B is a side view. In FIGS. 2A and 2B, resin R is represented by a dashed line. In addition, FIG. 3 illustrates an exploded view of the conductive resin body 10 in FIGS. 2A and 2B, and the resin R is omitted.

Figure 3:
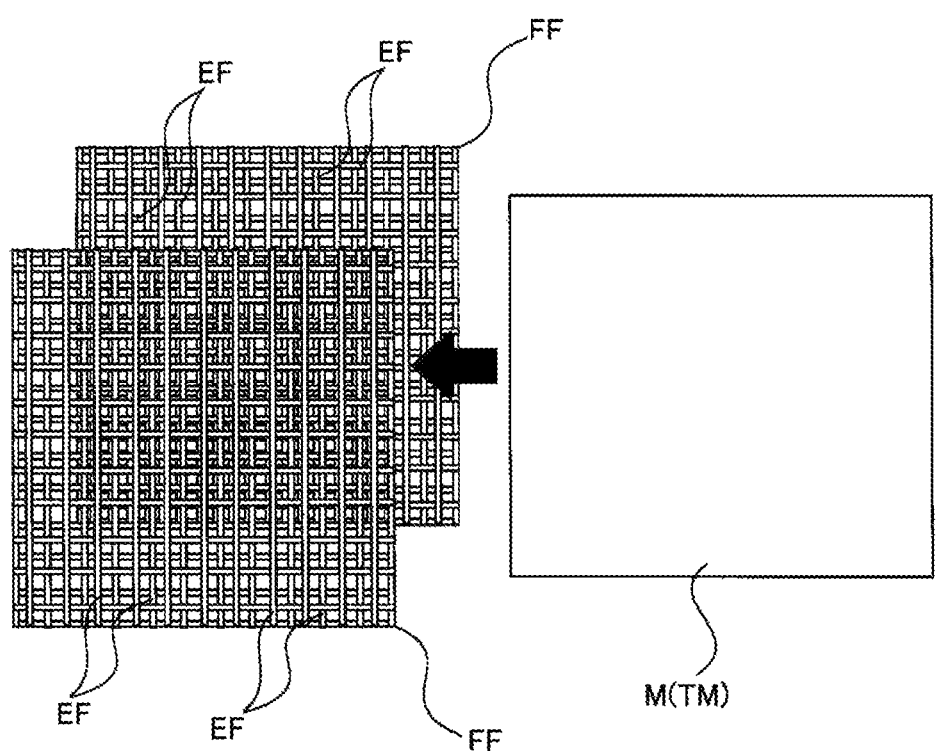
FIG. 3 illustrates an exploded view of the conductive resin body in FIGS. 2A and 2B.

As illustrated in FIGS. 2A and 2B and 3, the conductive resin body 10 includes a plurality of conductive fibers EF and the metal member M. The plurality of conductive fibers EF are obtained by performing metal plating on fiber made of at least one type of carbon fiber, high-strength fiber, and glass fiber. For example, the conductive fiber EF in the embodiment is woven as the warp and weft and configures fiber fabric FF. In the embodiment, layers of the fiber fabric FF are stacked and form a stacked body LB by stacking two or more layers of the plurality of conductive fibers EF.

The metal member M is in direct contact with a part (or the entirety) of the plurality of conductive fibers EF, thereby being electrically connected to the conductive fiber EF. The metal member M is configured to include a thin metal member TM (metal plate or metal foil) positioned in one layer of the two or more layers of the stacked body LB. In particular, the thin metal member TM illustrated in FIGS. 2A and 2B and 3 is provided over the entirety of the layer, and is in contact with and is electrically connected to the plurality of conductive fibers EF through a wide region.

In addition, as illustrated in FIGS. 2A and 2B, the metal member M has a part that is buried in the resin R and the rest that is exposed from the resin R. The metal member M is provided with bolt holes having a diameter in the exposed portion in advance, the negative terminal T of the vehicle battery B or the negative terminals of the in-vehicle devices VD are electrically connected to the portion of the metal member M that is exposed from the resin R.

The metal members M may be provided in a scattered manner so as to correspond to electrical connection positions with the negative terminal T of the vehicle battery B and the negative terminals of the in-vehicle devices VD, or may be provided over the entire vehicle body (frame). In addition, the conductive fiber EF in FIGS. 2A and 2B and 3 is regularly arranged in a plane; however, the arrangement is not limited thereto, and the conductive fiber EF may extend in an irregular direction or may be curved so as to be arranged in a plane, or may not be arranged in a plane.

Here, in the embodiment, it is preferable that carbon fiber is employed as the metal-plated fiber. However, the wettability of the carbon fiber by copper is low and a plating precipitation property and adhesiveness of copper is low even when electroplating is performed. In a case where copper plating is performed on the carbon fiber in the embodiment, carbon fiber exposed to supercritical carbon dioxide is used so as to have a surface oxygen content different from that of the carbon fiber in the related art, and the carbon fiber is subjected to the copper plating.

Here, the surface oxygen content in the embodiment is a value $(O_{1S}/C_{1S})$ obtained by dividing $O_{1S}$ peak strength measured through X-ray photoelectron spectroscopy by $C_{1S}$ peak strength measured through the same spectroscopy. The more the surface of the carbon fiber is oxidized, the higher the $O_{1S}$ peak strength measured through the X-ray photoelectron spectroscopy. Therefore, the value of the surface oxygen content tends to be high.

The number of surface oxygen atoms is known to increase at about the same rate as the number of acidic functional groups. In addition, the acidic functional groups are considered to contribute to interfacial adhesion. The carbon fiber according to the embodiment has the surface oxygen content of 0.097 or larger and 0.138 or smaller. This is because it is possible to improve the plating precipitation property and adhesiveness. When the surface oxygen content is smaller than 0.097, the adhesiveness to copper tends to be remarkably reduced. In addition, when the surface oxygen content is larger than 0.138, surface oxygen of the carbon fiber inhibits a power supply unit from coming into contact with the carbon fiber during the electroplating. Therefore, it is difficult for currents flow the carbon fiber, and bad plating precipitation property tends to be obtained.

Next, a method for manufacturing the conductive resin body 10 according to the embodiment will be described. In the manufacturing of the conductive resin body 10, first, a plurality of strands of fiber (carbon fiber) are subjected to metal plating (copper plating) and the plurality of conductive fibers EF are formed (plating step).

Figure 4:
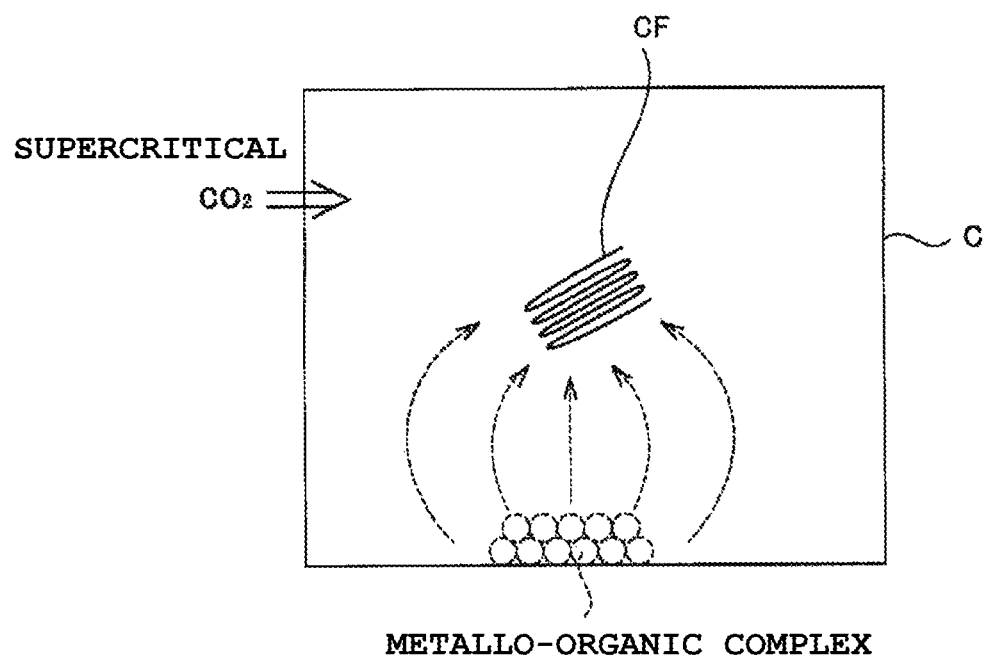
FIG. 4 is a schematic diagram for illustrating a plating method for carbon fiber.

FIG. 4 is a schematic diagram for illustrating a plating method for the carbon fiber. In the embodiment, in order to perform the metal plating on the carbon fiber CF, first, the carbon fiber CF is put into a processing tank C (first step). Here, in the first step, in the embodiment, metallo-organic complexes are not put into the processing tank C. This is because, even when the metallo-organic complexes are not put into the processing tank C, it is possible to obtain predetermined plating precipitation property and adhesiveness.

Next, supercritical carbon dioxide is supplied into the processing tank C into which the carbon fiber CF has been put (second step). The carbon fiber CF is taken out from the processing tank C after a predetermined period of time has elapsed since the supercritical carbon dioxide is supplied (third step). In this manner, it is possible to obtain the carbon fiber CF described above that has the surface oxygen content of 0.097 or larger and 0.138 or smaller.

Then, the so called electroplating is performed and the metal plating (copper plating) is performed on the carbon fiber CF (fourth step).

As described above, the carbon fiber is exposed to the supercritical carbon dioxide, and thereby it is possible to change the surface oxygen content of the carbon fiber such that the surface oxygen content is 0.097 or larger and 0.138 or smaller. In the first step described above, as illustrated by dashed lines in FIG. 4, metallo-organic complexes may be put into the processing tank C.

Next, the plurality of conductive fibers EF obtained in the plating step described above are woven as the warp and weft and form a plurality of layers of fiber fabric FF. Then, the plurality of layers of fiber fabric FF are stacked and form the stacked body LB by stacking two or more layers of the plurality of conductive fibers EF. In addition, in the process of forming the stacked body LB, the thin metal member TM is sandwiched in one layer. In this manner, an assembly A, in which the metal member M is electrically connected the plurality of conductive fibers EF, is formed (electrical connection step). The thin metal member TM in the assembly A has a part that is sandwiched in the stacked body LB and the rest that is in a state of protruding from the stacked body LB.

Next, the assembly A obtained in the electrical connection step is put into a mold and the resin R is injected into the mold and is hardened. At this time, resin molding is performed such that a part of the metal member M is buried in the resin R and the rest thereof is exposed from the resin R (resin molding step). In this manner, the conductive resin body 10 is manufactured.

In the above description, the stacked body LB including the plurality of layers of fiber fabric FF is formed by weaving the plurality of conductive fibers EF as the warp and weft; however, the stacked body LB is not limited thereto, and an intermediate member IM may formed by impregnating, with the resin R, the fiber fabric FF (the plurality of conductive fibers EF) obtained in the plating step before the electrical connection step (intermediate member forming step), and the intermediate members IM may be stacked so as to form the stacked body LB. The thin metal member TM may be sandwiched in the process of stacking the intermediate members IM.

In this manner, in the conductive resin body 10 and the manufacturing method thereof according to the first embodiment, since a part of the metal member M is buried and the rest thereof is exposed, the conductive resin body 10 and the metal member M are integrally formed such that the number of components is prevented from increasing, and it is not necessary to attach the metal member M later. Hence, it is possible to provide the conductive resin body 10 by which it is possible to prevent an increase in the number of components and it is possible not to use the attachment process of a metal member M.

In addition, in the conductive resin body 10 described above, the plurality of conductive fibers EF form the stacked body LB by stacking two or more layers thereof, and the metal member M is a planar thin metal member TM positioned in one layer of the two or more layers. Therefore, the metal member M is sandwiched, and thus, it is possible to bury the metal member M in which there is reduction in a possibility that the metal member M will drop from the conductive resin body 10.

In the method for manufacturing the conductive resin body 10 described above, since the intermediate member IM is formed by impregnating the plurality of conductive fibers EF with the resin R, the plurality of conductive fibers EF are prevented from moving when resin molding is performed in a mold in the resin molding step, and thus it is possible to reduce frequency of an occurrence of an electrical connection problem with the metal member M.

In addition, the inventors of the present invention finds that, when the surface oxygen content of 0.097 or larger and 0.138 or smaller, wettability improves in the metal plating and it is possible to improve the plating precipitation property and the adhesiveness. Accordingly, the surface oxygen content of the carbon fiber described above is set in the range described above, and thereby it is possible to improve the plating precipitation property and the adhesiveness. Moreover, since it is suitable for the surface oxygen content to be set in the range described above, there is no need to use alkali, and thus it is also possible to reduce a decrease in the mechanical strength.

Additionally, in the vehicle earth structure according to the first embodiment, since the portion of the metal member M of the conductive resin body 10, which is exposed from the resin R, is electrically connected to the negative terminals T of the in-vehicle devices VD and the vehicle battery B, it is possible to use fiber-reinforced resin in a portion called a body for a vehicle in which the strength is required, and it is possible to build an earth structure through electrical connection with the negative terminals T of the in-vehicle devices VD and the vehicle battery B because predetermined conductivity is obtained with the fiber subjected to the metal plating. Additionally, it is possible to provide the earth structure in which it is possible to electrically connect the negative terminal T to the exposed portion of the metal member M, and thus it is not necessary to perform the attachment process of the metal member M.

Next, a second embodiment of the present invention will be described. The second embodiment is the same as the first embodiment except that the configuration of the conductive resin body 10 and the method for manufacturing the conductive resin body have different parts. Hereinafter, the differences from the first embodiment will be described.

Figure 5A:
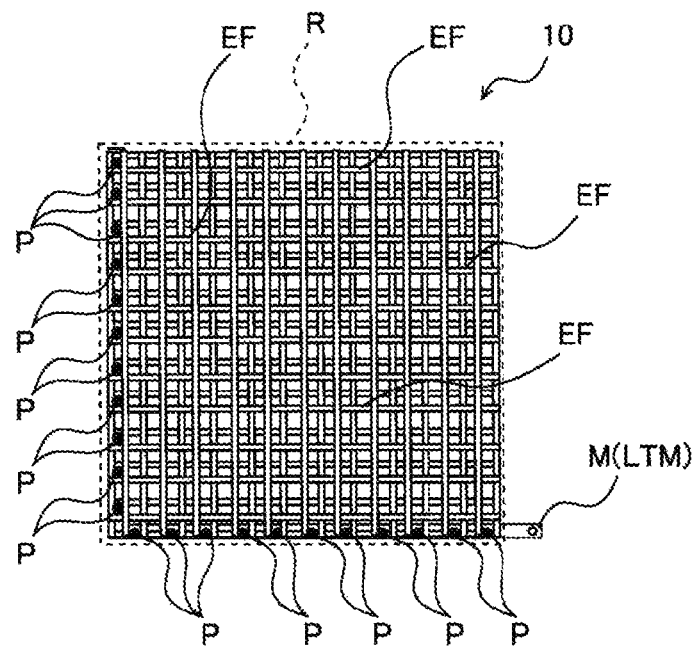
FIGS. 5A and 5B illustrate external views of a conductive resin body according to a second embodiment.
Figure 5B:
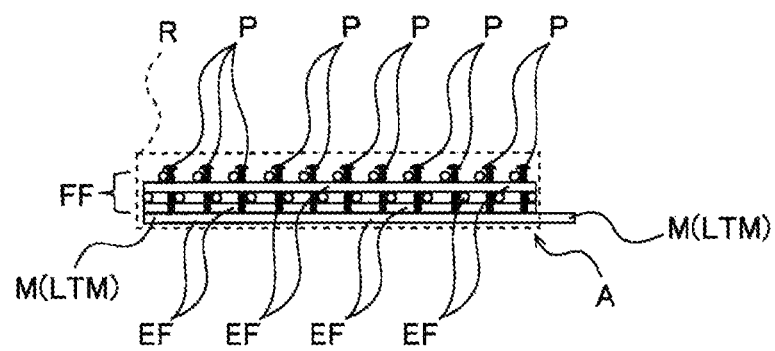

FIGS. 5A and 5B illustrate external views of the conductive resin body 10 according to the second embodiment, FIG. 5A is a plan view, and FIG. 5B is a side view. In FIGS. 5A and 5B, resin R is represented by a dashed line. In addition, FIG. 6 illustrates an exploded view of the conductive resin body 10 in FIGS. 5A and 5B, and the resin R is omitted.

As illustrated in FIGS. 5A and 5B and 6, the conductive resin body 10 according to the second embodiment includes a plurality of metal pins P made of conductive metal. Further, in the second embodiment, the planar thin metal member LTM having an L shape in plan view is included as the metal member M.

In addition, the fiber fabric FF (obtained by stacking one or a plurality of layers of conductive fiber EF) made of the plurality of conductive fibers EF is disposed on an L-shaped thin metal member LTM and metal pins P are arranged to pierce the L-shaped thin metal member LTM through the fiber fabric FF so as to correspond to the L-shaped thin metal member LTM. In this manner, the plurality of conductive fibers EF are electrically connected to the metal member M via the metal pins P as another conductive member.

The metal pins P in the second embodiment pierce the fiber fabric FF at an angle perpendicular to the planar fiber fabric FF; however, the angle is not limited thereto, and the pins may extend to pierce the fiber fabric FF in a direction intersecting with the plane. In other words, the metal pins P may pierce the fiber fabric FF in a somewhat inclined direction.

Similar to the first embodiment, in the manufacturing of the conductive resin body 10, the plating step is performed. Next, the plurality of conductive fibers EF obtained in the plating step are woven as the warp and weft and form one or more layers of fiber fabric FF, and the fiber fabric FF is disposed on the L-shaped thin metal member LTM. Subsequently, the plurality of metal pins P pierce the fiber fabric FF so as to correspond to the L-shaped thin metal member LTM. In this manner, an assembly A, in which the metal member M is electrically connected to the plurality of conductive fibers EF, is formed (electrical connection step). The L-shaped thin metal member LTM in the assembly A has a part that is in a state of protruding from the fiber fabric FF in plan view.

Next, the assembly A obtained in the electrical connection step is put into a mold and the resin R is injected into the mold and is hardened. At this time, resin molding is performed such that a part of the metal member M is buried in the resin R and the rest thereof is exposed from the resin R (resin molding step). In this manner, the conductive resin body 10 is manufactured.

The intermediate member IM may be formed in the same manner as in the first embodiment described above (intermediate member forming step).

In this manner, similar to the first embodiment, in the conductive resin body 10 and the manufacturing method thereof according to the second embodiment, it is possible to provide the conductive resin body 10 by which it is possible to prevent an increase the number of components and it is possible not to use an attachment process of the metal member M. In addition, in a case where the intermediate member IM is formed, the plurality of conductive fibers EF are prevented from moving when resin molding performed in the mold in the resin molding step, and thus it is possible to reduce frequency of an occurrence of an electrical connection problem with the metal member M. Further, the surface oxygen content of the carbon fiber described above is set in the range described above, and thereby it is possible to improve the plating precipitation property and the adhesiveness. Moreover, since it is suitable for the surface oxygen content to be set in the range described above, there is no need to use alkali, and thus it is also possible to reduce a decrease in the mechanical strength. Additionally, in the vehicle earth structure 1, it is possible to provide the earth structure in which it is not necessary to perform the attachment process of the metal member M.

In addition, in the second embodiment, since the metal pins P extend in the direction intersecting with the plane, and electrically connects the conductive fiber EF and the L-shaped thin metal member LTM, the conductive fiber EF and the L-shaped thin metal member LTM may not be brought into direct contact with each other, and it is possible to achieve easy conduction between the conductive fiber EF and the L-shaped thin metal member LTM.

Next, a third embodiment of the present invention will be described. The third embodiment is the same as the first embodiment except that the configuration of the conductive resin body 10 and the method for manufacturing the conductive resin body have different parts. Hereinafter, the differences from the first embodiment will be described.

Figure 7A:
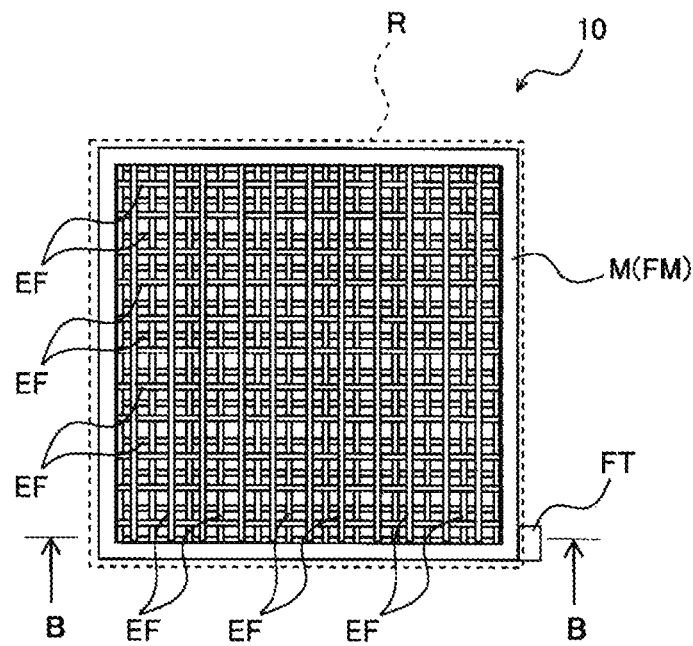
FIGS. 7A and 7B illustrate configurational views of a conductive resin body according to a third embodiment.
Figure 7B:
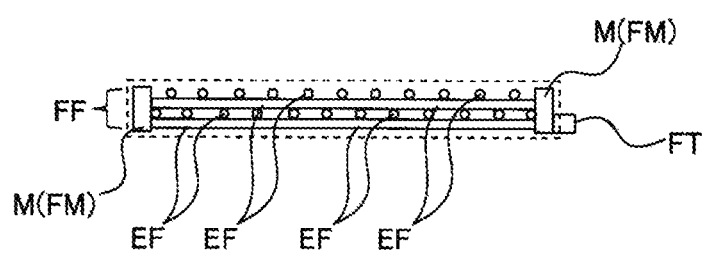

FIGS. 7A and 7B illustrate configurational views of the conductive resin body 10 according to the third embodiment, FIG. 7A is a plan view, and FIG. 7B is a sectional view taken along line B-B in FIG. 7A. In FIGS. 7A and 7B, resin R is represented by a dashed line. In addition, FIG. 8 illustrates an exploded view of the conductive resin body 10 in FIGS. 7A and 7B, and the resin R is omitted.

As illustrated in FIGS. 7A and 7B and 8, the conductive resin body 10 according to the third embodiment includes a frame member FM as the metal member M. The frame member FM is a metal member having a substantially rectangular frame shape in plan view, and includes a terminal portion FT that protrudes outward from one corner. The terminal portion FT is connected to the negative terminal T of the vehicle battery B and the negative terminals of the in-vehicle devices VD.

In addition, the frame member FM is disposed on an outer peripheral side of the plane of the fiber fabric FF (obtained by stacking one or the plurality of layers) made of the plurality of conductive fibers EF. In the third embodiment, the plurality of conductive fibers EF are electrically connected to the metal member M in a state in which the metal member surrounds the conductive fiber EF.

Similar to the first embodiment, in the manufacturing of the conductive resin body 10, the plating step is performed. The plurality of conductive fibers EF obtained in the plating step are woven as the warp and weft and form one or more layers of fiber fabric FF, and the fiber fabric is disposed inside the substantially rectangular frame member FM. In this manner, an assembly A, in which the metal member M is electrically connected to the plurality of conductive fibers EF, is formed (electrical connection step).

Next, the assembly A obtained in the electrical connection step is put into a mold and the resin R is injected into the mold and is hardened. At this time, resin molding is performed such that the terminal portion FT is exposed from the resin R (resin molding step). In this manner, the conductive resin body 10 is manufactured.

The intermediate member IM may formed in the same manner as in the first embodiment described above (intermediate member forming step).

In this manner, similar to the first embodiment, in the conductive resin body 10 and the manufacturing method thereof according to the third embodiment, it is possible to provide the conductive resin body 10 by which it is possible to prevent an increase the number of components and it is possible not to use an attachment process of the metal member M. In addition, in a case where the intermediate member IM is formed, the plurality of conductive fibers EF are prevented from moving when resin molding performed in the mold in the resin molding step, and thus it is possible to reduce frequency of an occurrence of an electrical connection problem with the metal member M. Further, the surface oxygen content of the carbon fiber described above is set in the range described above, and thereby it is possible to improve the plating precipitation property and the adhesiveness. Moreover, since it is suitable for the surface oxygen content to be set in the range described above, there is no need to use alkali, and thus it is also possible to reduce a decrease in the mechanical strength. Additionally, in the vehicle earth structure 1, it is possible to provide the earth structure in which it is not necessary to perform the attachment process of the metal member M.

In addition, in the third embodiment, the plurality of conductive fibers EF are arranged in the plane, and the metal member M is the frame member FM provided on the outer peripheral side of the plane of the plurality of conductive fibers EF arranged in the plane. Therefore, electrical connection is performed in a state in which the metal member M surrounds the plurality of conductive fibers EF, and thus it is possible to provide the conductive resin body 10 in which it is relatively easy to impregnate the fiber with the resin R without inhibiting the conductive fiber EF from being impregnated with the resin R by the presence of the metal member M.

Next, a fourth embodiment of the present invention will be described. The fourth embodiment is the same as the first embodiment except that the configuration of the conductive resin body 10 and the method for manufacturing the conductive resin body 10 have different parts. Hereinafter, the differences from the first embodiment will be described.

FIG. 9 illustrates an exploded view of the conductive resin body 10 according to the fourth embodiment, and the resin R is omitted. As illustrated in FIG. 9, the conductive resin body 10 according to the fourth embodiment includes a plurality of openings H in the thin metal member TM as the metal member M. The openings H are formed in a region overlapping the fiber fabric FF and penetrate through the thin metal member TM. In addition, the openings H have a sufficient size to the extent that the resin R passes through the openings during the molding of the resin R.

The method for manufacturing the conductive resin body 10 is the same as the in the first embodiment; however, it is easy for the resin R to flow between the front and the back of the thin metal member TM through the openings H in the resin molding step, and thus the openings H contribute to improvement of the degree of the adhesion of the thin metal member TM to the resin R.

In this manner, similar to the first embodiment, in the conductive resin body 10 and the manufacturing method thereof according to the fourth embodiment, it is possible to provide the conductive resin body 10 by which it is possible to prevent an increase in the number of components and it is possible not to use an attachment process of the metal member M. In addition, it is possible to bury the metal member M in which the metal member M is sandwiched, and there reduction in a possibility that the metal member M will drop from the conductive resin body 10. Further, in a case where the intermediate member IM is formed, the plurality of conductive fibers EF are prevented from moving when resin molding is performed in the mold in the resin molding step, and thus it is possible to reduce frequency of an occurrence of an electrical connection problem with the metal member M. Additionally, the surface oxygen content of the carbon fiber described above is set in the range described above, and thereby it is possible to improve the plating precipitation property and the adhesiveness. Moreover, since it is suitable for the surface oxygen content to be set in the range described above, there is no need to use alkali, and thus it is also possible to reduce a decrease in the mechanical strength. Further, in the vehicle earth structure 1, it is possible to provide the earth structure in which it is not necessary to perform the attachment process of the metal member M.

In addition, in the fourth embodiment, since the thin metal member TM is provided with the plurality of openings H, portions of the resin R on both surfaces of the thin metal member TM are connected through the openings H, and thus it is possible to improve a degree of adhesion of the thin metal member TM to the resin R.

Next, a fifth embodiment of the present invention will be described. The fifth embodiment is the same as the first embodiment except that the configuration of the conductive resin body 10 and the method for manufacturing the conductive resin body 10 have different parts. Hereinafter, the differences from the first embodiment will be described.

Figure 10A:
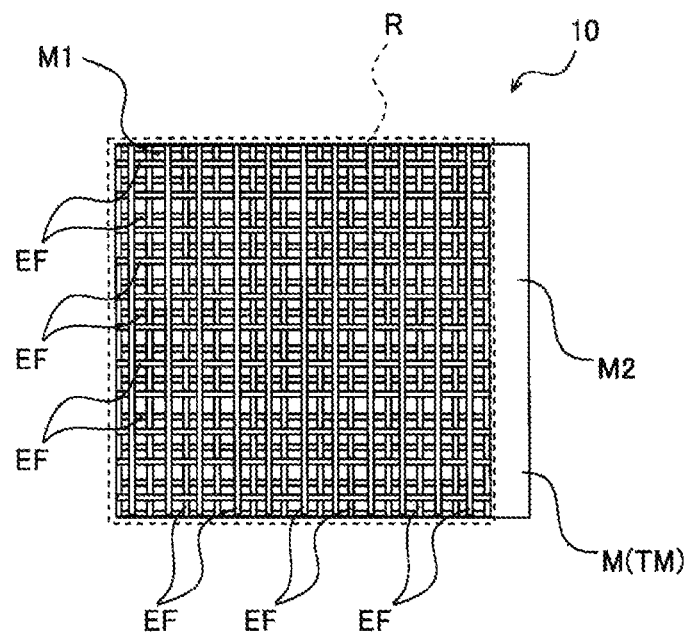
FIGS. 10A and 10B illustrate configurational views of a conductive resin body according to a fifth embodiment.
Figure 10B:
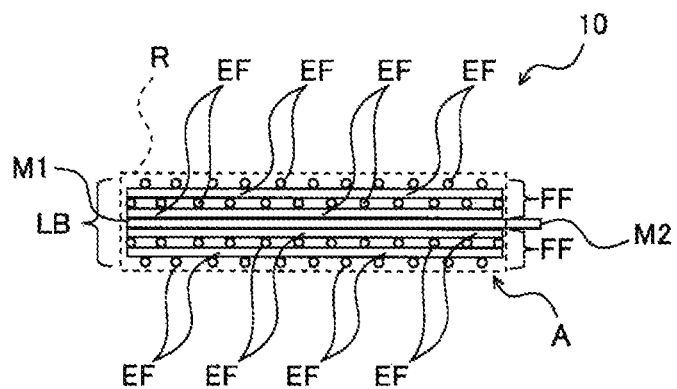

FIGS. 10A and 10B illustrate configurational views of the conductive resin body 10 according to the fifth 15 embodiment. FIG. 10A is a plan view, and FIG. 10B is a sectional view of FIG. 10A. In FIGS. 10A and 10B, the resin R is represented by a dashed line. In addition. FIG. 11 illustrates an exploded view of the conductive resin body 10 in FIGS. 10A and 10B, and the resin R is omitted.

As illustrated in FIGS. 10A and 10B and 11, the conductive resin body 10 according to the fifth embodiment includes the metal member M (thin metal member TM) formed by two members. In other words, the metal member M is formed by a first metal member M1 and a second metal member M2. The first metal member M1 is positioned in one layer of the two or more layers of the stacked body LB and is buried to have only a side surface which is exposed from the resin R. The second metal member M2 is connected to the exposed side surface of the first metal member M1, and is connected to the negative terminal T of the vehicle battery B or the negative terminals of the in-vehicle devices VD.

Similar to the first embodiment, in the manufacturing of the conductive resin body 10, the plating step is performed. The plurality of conductive fibers EF obtained in the plating step are woven as the warp and weft and form the plurality of layers of fiber fabric FF, and the plurality of layers of fiber fabric FF are stacked to form the stacked body LB obtained by stacking two or more layers of the plurality of conductive fibers EF. In addition, in the process of forming the stacked body LB, the first metal member M1 is sandwiched in one layer. In this manner, an assembly A, in which the metal member M is electrically connected to the plurality of conductive fibers EF, is formed (electrical connection step).

Next, the assembly A obtained in the electrical connection step is put into a mold and the resin R is injected into the mold and is hardened. At this time, resin molding is performed such that one side surface of the first metal member M1 is exposed from the resin R (resin molding step). Then, the second metal member M2 is bonded to the exposed side surface of the first metal member M1 by using an ultrasonic wave or a laser beam. In this manner, the conductive resin body 10 is manufactured.

The intermediate member IM may be formed in the same manner as in the first embodiment described above (intermediate member forming step).

In this manner, similar to the first embodiment, in the conductive resin body 10 and the manufacturing method thereof according to the fifth embodiment, it is possible to provide the conductive resin body 10 by which it is possible to prevent an increase the number of components and it is possible not to use an attachment process of the metal member M. In addition, it is possible to bury the metal member M in which the metal member M is sandwiched, and there is reduction in a possibility that the metal member M will drop from the conductive resin body 10. Further, in a case where the intermediate member IM is formed, the plurality of conductive fibers EF are prevented from moving when resin molding is performed in the mold in the resin molding step, and thus it is possible to reduce frequency of an occurrence of an electrical connection problem with the metal member M. Additionally, the surface oxygen content of the carbon fiber described above is set in the range described above, and thereby it is possible to improve the plating precipitation property and the adhesiveness. Moreover, since it is suitable for the surface oxygen content to be set in the range described above, there is no need to use alkali, and thus it is also possible to reduce a decrease in the mechanical strength. Further, in the vehicle earth structure 1, it is possible to provide the earth structure in which it is not necessary to perform the attachment process of the metal member M.

As described above, the present invention is described based on the embodiments; however, the present invention is not limited to the embodiments described above. The present invention may have additional modification in a range without departing from the gist of the present invention and may be appropriately combined with another publicly known or well-known technology to the extent that it is possible to perform the combination. In addition, the embodiments may be combined.

For example, in the embodiments, the conductive resin body 10 is used as the vehicle earth structure 1; however, the invention is not limited to the case, and, for example, the conductive resin body may be applied to another use for shielding, a conductive circuit, or the like.

In addition, in the fifth embodiment, the metal member M is configured to have two members; however, the number of members is not limited thereto, and the metal member may be configured to have three or more members. In addition, the embodiment is not limited to the case where the thin metal member TM is configured to have two or more members, and the L-shaped thin metal member LTM and the frame member FM described in the second and third embodiments may also be configured to have two or more members.

DESCRIPTION OF REFERENCE NUMERALS AND SIGNS

1: vehicle earth structure
10: conductive resin body
EF: conductive fiber
FF: fiber fabric
M: metal member
TM: thin metal member
LTM: L-shaped thin metal member
FM: frame member
FT: terminal portion
H: opening
R: resin
P: metal pin

What is claimed is:

1. A conductive resin body comprising:
   a plurality of conductive fibers which comprise at least one type of carbon fibers, high-strength fibers, and glass fibers, and which are metal plated;
   a metal member which is electrically connected to the plurality of conductive fibers; and
   resin in which a first part of the metal member is buried and with which the plurality of conductive fibers are impregnated, wherein a second part of the metal member is exposed from the resin,
   wherein a height of the metal member is substantially constant when viewed along a cross-section of the conductive resin body.

2. The conductive resin body according to claim 1, wherein the plurality of conductive fibers have a structure of a stacked body in which two or more layers are stacked, and
   wherein the metal member is a planar thin metal member positioned between two adjacent layers of the two or more layers.

3. The conductive resin body according to claim 2, wherein the metal member includes a plurality of openings.

4. The conductive resin body according to claim 1, wherein the plurality of conductive fibers are arranged in a plane, and
   wherein the metal member includes a frame member positioned along an outer peripheral side of the plane in which the plurality of conductive fibers are arranged.

5. An earth of a vehicle comprising:
   the conductive resin body according to claim 1, which is used as a body for a vehicle,
   wherein a portion of the metal member of the conductive resin body, which is exposed from the resin, is electrically connected to a negative terminal of a in-vehicle device and a vehicle battery.

6. The conductive resin body according to claim 1, wherein the metal member is not stacked with additional metal members.

7. The conductive resin body according to claim 1, wherein the metal member is a unitary body.

8. A conductive resin body comprising:
   a plurality of conductive fibers which comprise at least one type of carbon fibers, high-strength fibers, and glass fibers, and which are metal plated;
   a metal member which is electrically connected to the plurality of conductive fibers; and
   resin in which a first part of the metal member is buried and with which the plurality of conductive fibers are impregnated, wherein a second part of the metal member is exposed from the resin,
   a conductive metal pin,
   wherein the plurality of conductive fibers are arranged in a plane,
   wherein the metal member is a planar thin metal member that is stacked on the plurality of conductive fibers arranged in the plane, and
   wherein the metal pin extends in a direction intersecting with the plane, and electrically connects the plurality of conductive fibers and the metal member.

9. A method for manufacturing a conductive resin body comprising:
   metal plating a plurality of fibers which are made of at least one type of carbon fiber, high-strength fiber, and glass fiber to produce a plurality of conductive fibers;
   assembling and electrically connecting a metal member to the plurality of conductive fibers, wherein a height of the metal member is substantially constant when viewed along a cross-section of the conductive resin body; and
   molding an assembly with resin such that a first part of the metal member is buried in the resin and a second part of the metal member is exposed from the resin.

10. The method for manufacturing a conductive resin body according to claim 9, further comprising:
    molding the plurality of conductive fibers with the resin and forming an intermediate member which is metal plated before the assembling and electrically connecting,
    wherein, in the assembling and electrically connecting, the metal member is electrically connected to the plurality of conductive fibers which the intermediate member includes.

* * * * *